(12) United States Patent
Patel et al.

(10) Patent No.: US 6,191,057 B1
(45) Date of Patent: Feb. 20, 2001

(54) FACING SYSTEM FOR AN INSULATION PRODUCT

(75) Inventors: Bharat D. Patel, Reynoldsburg; Weigang Qi, Westerville; Dallas L. Dudgeon, Newark; Matthew C. Brokaw, Bellville; Larry J. Grant, Westerville; Russell M. Potter, Hebron, all of OH (US)

(73) Assignee: Owens Corning Fiberglas Technology, Inc., Summit, IL (US)

( * ) Notice: Under 35 U.S.C. 154(b), the term of this patent shall be extended for 0 days.

(21) Appl. No.: 09/386,806

(22) Filed: Aug. 31, 1999

Related U.S. Application Data

(62) Division of application No. 09/088,990, filed on Jun. 2, 1998.

(51) Int. Cl.[7] .............................. B32B 27/28; D04H 1/00
(52) U.S. Cl. ......................... 442/398; 442/394; 428/68; 428/74; 428/76; 156/293
(58) Field of Search ..................................... 412/398, 394; 428/68, 74, 76; 156/293

(56) References Cited

U.S. PATENT DOCUMENTS

| | | |
|---|---|---|
| 2,566,619 | 9/1951 | Lyon et al. . |
| 3,180,778 | 4/1965 | Rinderspacher et al. . |
| 3,546,846 | 12/1970 | Sens . |
| 3,616,185 | 10/1971 | Goldberg . |
| 3,913,579 | 10/1975 | Srinivasan et al. . |
| 3,955,031 | 5/1976 | Jones et al. . |
| 4,370,374 | 1/1983 | Raabe et al. . |
| 4,381,330 | 4/1983 | Gotomyo et al. . |
| 4,420,521 | 12/1983 | Carr . |
| 4,581,392 | 4/1986 | Armstrong et al. . |
| 4,630,320 | 12/1986 | Van Gompel . |
| 4,759,964 | 7/1988 | Fischer et al. . |
| 4,927,705 | 5/1990 | Syme et al. . |
| 4,952,441 | 8/1990 | Bose et al. . |
| 4,968,556 | 11/1990 | Jain . |
| 4,975,316 | 12/1990 | Romanowski . |
| 5,169,700 | 12/1992 | Meier et al. . |
| 5,211,988 | 5/1993 | Morton . |
| 5,236,754 | 8/1993 | McBride et al. . |
| 5,240,527 | 8/1993 | Lostak et al. . |
| 5,277,955 | 1/1994 | Schelhorn et al. . |
| 5,317,052 | 5/1994 | Ohba et al. . |
| 5,318,644 | 6/1994 | McBride et al. . |
| 5,362,539 | 11/1994 | Hall et al. . |
| 5,435,963 | 7/1995 | Rackovan et al. . |
| 5,466,504 | 11/1995 | Gavin et al. . |
| 5,609,934 | 3/1997 | Fay . |
| 5,633,064 | 5/1997 | Ragland et al. . |
| 5,674,600 | 10/1997 | Hargarter et al. . |
| 5,733,624 | 3/1998 | Syme et al. . |
| 5,746,854 | * 5/1998 | Romes et al. .................. 156/62.2 |
| 5,922,626 | * 7/1999 | Pelzer ............................... 442/392 |
| 6,001,460 | * 12/1999 | Morman et al. .................. 428/195 |
| 6,093,473 | * 7/2000 | Min ................................... 428/147 |
| 6,096,668 | * 8/2000 | Abuto et al. ..................... 442/328 |

FOREIGN PATENT DOCUMENTS

| | | |
|---|---|---|
| 06092171 | 4/1994 | (JP) . |
| WO97/40237 | 10/1997 | (WO) . |

* cited by examiner

*Primary Examiner*—Janet Baxter
*Assistant Examiner*—Amanda C. Walke
(74) *Attorney, Agent, or Firm*—Inger H. Eckert; Stephen W. Barns

(57) ABSTRACT

An insulation product includes an elongated batt of fibrous insulation material, and a facing adhered to a major surface of the batt, wherein the facing is a coextruded polymer film of barrier and bonding layers, with the bonding layer having a softening point lower than the softening point of the barrier layer, with the bonding layer being one or more materials of the group consisting of ethylene N-butyl acrylate, ethylene methyl acrylate and ethylene ethyl acrylate, and wherein the facing has been heated to a temperature above the softening point of the bonding layer, but below the softening point of the barrier layer, whereby the facing is adhered to the batt by the attachment of the bonding layer to the fibers in the batt due to the softening of the bonding layer.

23 Claims, 7 Drawing Sheets

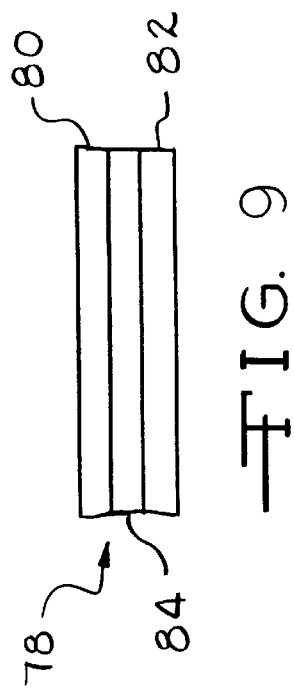
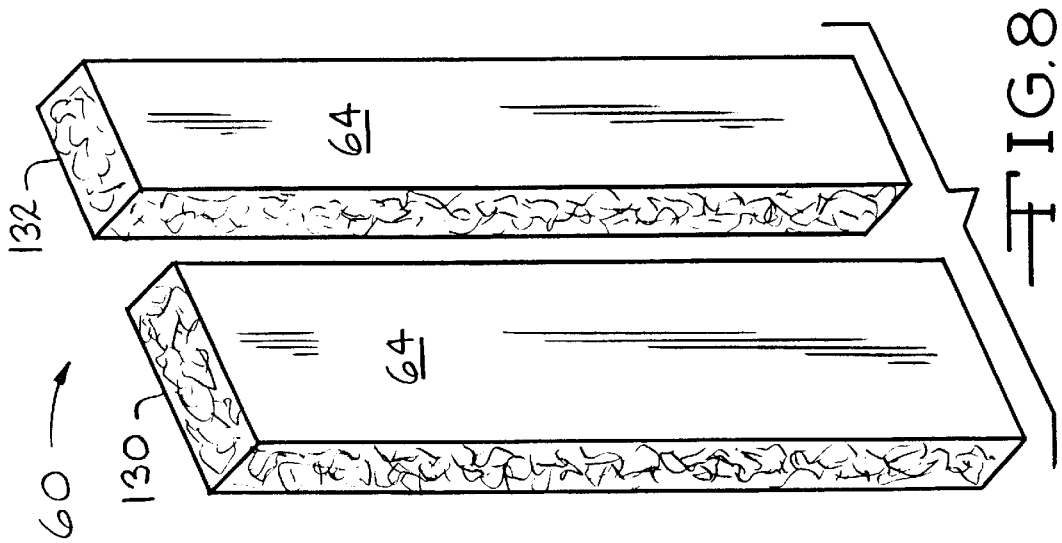

FACING SYSTEM FOR AN INSULATION PRODUCT

CROSS REFERENCE TO RELATED APPLICATION(S)

This is a division of U.S. patent application Ser. No. 09/088,990, filed Jun. 2, 1998, hereby incorporated by reference, pending.

TECHNICAL FIELD AND INDUSTRIAL APPLICABILITY OF THE INVENTION

This invention relates to fibrous insulation products, and in particular those insulation products of the type suitable for insulating buildings. More specifically, this invention pertains to insulation products having a facing system for providing a vapor barrier and/or for assisting in handling the insulation products.

BACKGROUND OF THE INVENTION

Fibrous insulation is typically formed by fiberizing molten material and depositing the fibers on a collecting conveyor. Typically the fibers for insulation products are mineral fibers, such as glass fibers, although some insulation products are made of organic fibers, such as polypropylene. Most fibrous insulation products contain a binder material to bond the fibers together where they contact each other, forming a lattice or network. The binder gives the insulation product resiliency for recovery after packaging, and provides stiffness and handleability so that the product can be handled and applied as needed in the insulation cavities of buildings. During manufacturing the insulation is cut into lengths to form individual insulation products, and the insulation products are packaged for shipping to customer locations.

One typical insulation product is an insulation batt, usually about 8 feet long, and generally suitable for use as wall insulation in residential dwellings, or as insulation in the attic and floor insulation cavities in buildings. The width of insulation batts designed for wall cavities is set to typical insulation cavity widths, such as about 14½ inches or 22½ inches for stud spacings of 16 and 24 inches, respectively. Some insulation products have a facing on one of the major surfaces. In many cases the facing acts as a vapor barrier, and in some insulation products, such as binderless products, the facing gives the product integrity for handleability. Faced insulation products are installed with the facing placed flat on the edge of the insulation cavity, typically the interior side or edge of the insulation cavity.

Insulation products where the facing is a vapor barrier are commonly used to insulate wall, floor or ceiling cavities that separate a warm interior space from a cold exterior space. The vapor barrier is usually placed to prevent moisture-laden air from the warm interior of the dwelling from entering the insulation. Otherwise, the water vapor in the warm interior air would enter the insulation material and then cool and condense within the insulation. This would result in a damp insulation product, which is incapable of performing at its designed efficiency. In warm climates it is sometimes preferable to install the vapor barrier on the exterior side of the insulation cavity to reduce the amount of vapor entering the building during the air conditioning season.

There are some insulation product requirements that call for insulation that is not vapor impermeable, but rather allows water vapor to pass through. For example, retrofit insulation products designed for adding additional insulation material on top of existing attic insulation should not have a vapor barrier. Also, insulation for wall cavities having a separate full wall vapor barrier, such as a 4.0 mil polyethylene film on the interior or warm side of the wall, do not require a vapor barrier on the insulation product itself. Further, encapsulation of fibrous glass batts for handling purposes is known. U.S. Pat. No 5,277,995 to Schelhorn et al. discloses an encapsulated batt with an encapsulation material adhered with an adhesive that can be applied in longitudinal stripes, or in patterns such as dots, or in an adhesive matrix. The Schelhorn et al. patent also discloses that an alternative method of attachment is for the adhesive layer to be an integral part of the encapsulation film, which, when softened, bonds to the fibers in the batt. U.S. Pat. No 5,733,624 to Syme et al. discloses a mineral fiber batt impregnated with a coextruded polymer layering system, and U.S. Pat. No 5,746,854 to Romes et al. discloses a method for impregnating a mineral fiber batt with a coextruded film.

Vapor barriers for insulation products are typically created with a layer of asphalt in conjunction with a kraft paper or foil facing material. The asphalt layer is applied in molten form and it is pressed against the fibrous insulation material before hardening to bond the kraft facing material to the insulation material. This asphalt and kraft paper system has the advantage of being relatively inexpensive. However, this facing system lacks flexibility because the asphalt/kraft layer is stiff, and working with the stiff asphalt/kraft facing slows down the installation of the insulation products. Also, cutting the facing without tearing the kraft paper is difficult in cool ambient temperatures because the asphalt can be brittle. Further, and the asphalt material is sticky in hot ambient temperatures, resulting in a gumming up of the cutting tool.

Even though the batts are manufactured to fit typical insulation cavities, many of the insulation cavities in buildings are of nonstandard dimensions. Window frames, door jambs, vent pipes, air ducts and electrical conduit are some of the typical obstructions that change the shape of the insulation cavity. During the process of installing the batts a significant portion of the batts must be cut to fit these non standard insulation cavities. In some dwellings up to 50 percent of the insulation cavities are nonstandard. Therefore, an important attribute of a faced building insulation product is the ease with which the facing can be cut and the ability of the facing to be placed flat on the edge of the insulation cavity after the facing has been cut. If the facing is not flat on the edge of the insulation cavity, the vapor barrier will be only partially effective. Further, insulation customers desire a smooth facing that is relatively flat on the edge of the insulation cavity.

In view of the above problems with currently available insulation products, it would be advantageous if there could be developed a faced insulation product having a facing material that can be easily cut to fit into nonstandard insulation cavities, and having a facing material that is flexible enough that it can accommodate faster installation of the cut insulation product into nonstandard insulation cavities with the facing in a flat condition at the edge of the insulation cavity.

SUMMARY OF THE INVENTION

The above objects as well as other objects not specifically enumerated are achieved by an insulation product comprising an elongated batt of fibrous insulation material, and a facing adhered to a major surface of the batt, wherein the facing is a coextruded polymer film of barrier and bonding layers, with the bonding layer having a softening point lower than the softening point of the barrier layer, with the bonding layer being one or more materials of the group consisting of ethylene N-butyl acrylate, ethylene methyl acrylate and ethylene ethyl acrylate, and wherein the facing has been heated to a temperature above the softening point of the bonding layer, but below the softening point of the barrier layer, whereby the facing is adhered to the batt by the attachment of the bonding layer to the fibers in the batt due to the softening of the bonding layer.

In another embodiment, the invention is an insulation product comprising an elongated batt of fibrous insulation material, and a facing adhered to a major surface of the batt, wherein the facing is a coextruded polymer film of barrier, carrier and bonding layers, with the bonding layer having a softening point lower than the softening point of the barrier layer, and with the carrier layer being positioned between the barrier and bonding layers, wherein the facing has been heated to a temperature above the softening point of the bonding layer, but below the softening point of the barrier layer, whereby the facing is adhered to the batt by the attachment of the bonding layer to the fibers in the batt due to the softening of the bonding layer.

In another embodiment, the invention is a method of making an insulation product comprising positioning a facing in contact with a major face of an elongated batt of fibrous insulation material, wherein the facing is a coextruded polymer film of barrier and bonding layers, with the bonding layer being one or more materials of the group consisting of ethylene N-butyl acrylate, ethylene methyl acrylate and ethylene ethyl acrylate, and with the bonding layer having a softening point lower than the softening point of the barrier layer, and heating the facing to a temperature above the softening point of the bonding layer, but below the softening point of the barrier layer, while maintaining the facing in contact with the batt to soften the bonding layer to an extent sufficient to attach the bonding layer to the fibers in the batt and thereby adhere the facing to the batt.

In yet another embodiment, the invention includes a method for installing an insulation product comprising providing an insulation product comprising an elongated batt of fibrous insulation material, and a facing adhered to a major surface of the batt, wherein the facing is a coextruded polymer film of barrier and bonding layers, with the bonding layer having a softening point lower than the softening point of the barrier layer, and wherein the facing has been heated to a temperature above the softening point of the bonding layer, but below the softening point of the barrier layer, whereby the facing is adhered to the batt by the attachment of the bonding layer to the fibers in the batt due to the softening of the bonding layer, and wherein the facing has no flanges, and installing the insulation product in an insulation cavity by pressing the insulation product into place between opposed structural members.

BRIEF DESCRIPTION OF THE DRAWINGS

FIG. 8 is a schematic perspective view illustrating a faced insulation product of the invention, having been slit longitudinally to provide a partial batt suitable for insulating the nonstandard insulation cavity of FIG. 1.

FIG. 9 is a schematic cross-sectional view in elevation illustrating the various layers of a multilayer facing film of the invention.

DETAILED DESCRIPTION AND PREFERRED EMBODIMENTS OF THE INVENTION

While the description and drawings disclose insulation products of fiberglass insulation, it is to be understood that the insulation material can be any compressible fibrous insulation material, such as rock wool and such as polypropylene.

Figure 1:
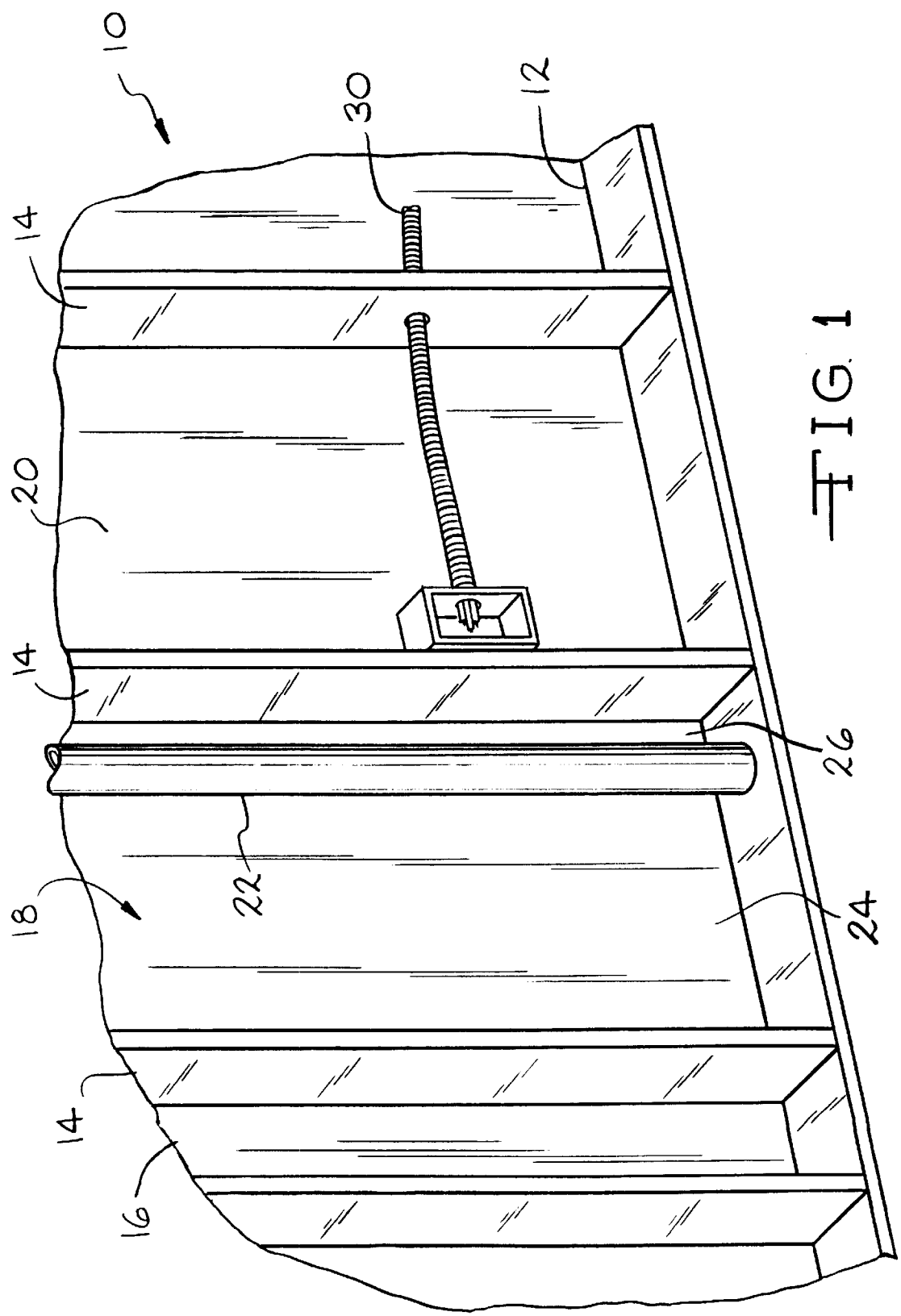
FIG. 1 is a schematic view in perspective of typical nonstandard wall insulation cavities.

As shown in FIG. 1, a typical wall structure, indicated generally at 10, includes a bottom plate 12 on which rests a plurality of studs 14. The bottom plate, studs and a top plate, not shown, define the four sides of insulation wall cavities 16, 18 and 20. The front and the back of the wall cavity are typically made of drywall on the interior side and foam sheathing on the exterior, both not shown. Wall cavity 16 can be considered to be a non-standard wall cavity since it has a width much narrower than that of a typical wall cavity. Insulating wall cavity 16 will require cutting the insulation product to a narrower width. Insulation cavity 18 is also difficult to insulate since there is a vent pipe 22 running vertically within the cavity, making cavity 18 a nonstandard cavity. Insulating cavity 18 will usually require cutting an insulation batt longitudinally into two narrower insulation pieces, not shown in FIG. 1. For insulation purposes, insulation cavity 18 can be considered to comprise two partial cavities, indicated at 24 and 26, each of which must be insulated. Insulation cavity 20 is also a nonstandard cavity since the insulation material must be positioned around an electrical outlet box 28 and conduit 30. Installation of the insulation material around these obstructions requires cutting the batt to fit it around the obstruction. Other typical obstructions include door jambs, window frames, air ducts, and water pipes, all not shown.

Figure 2:
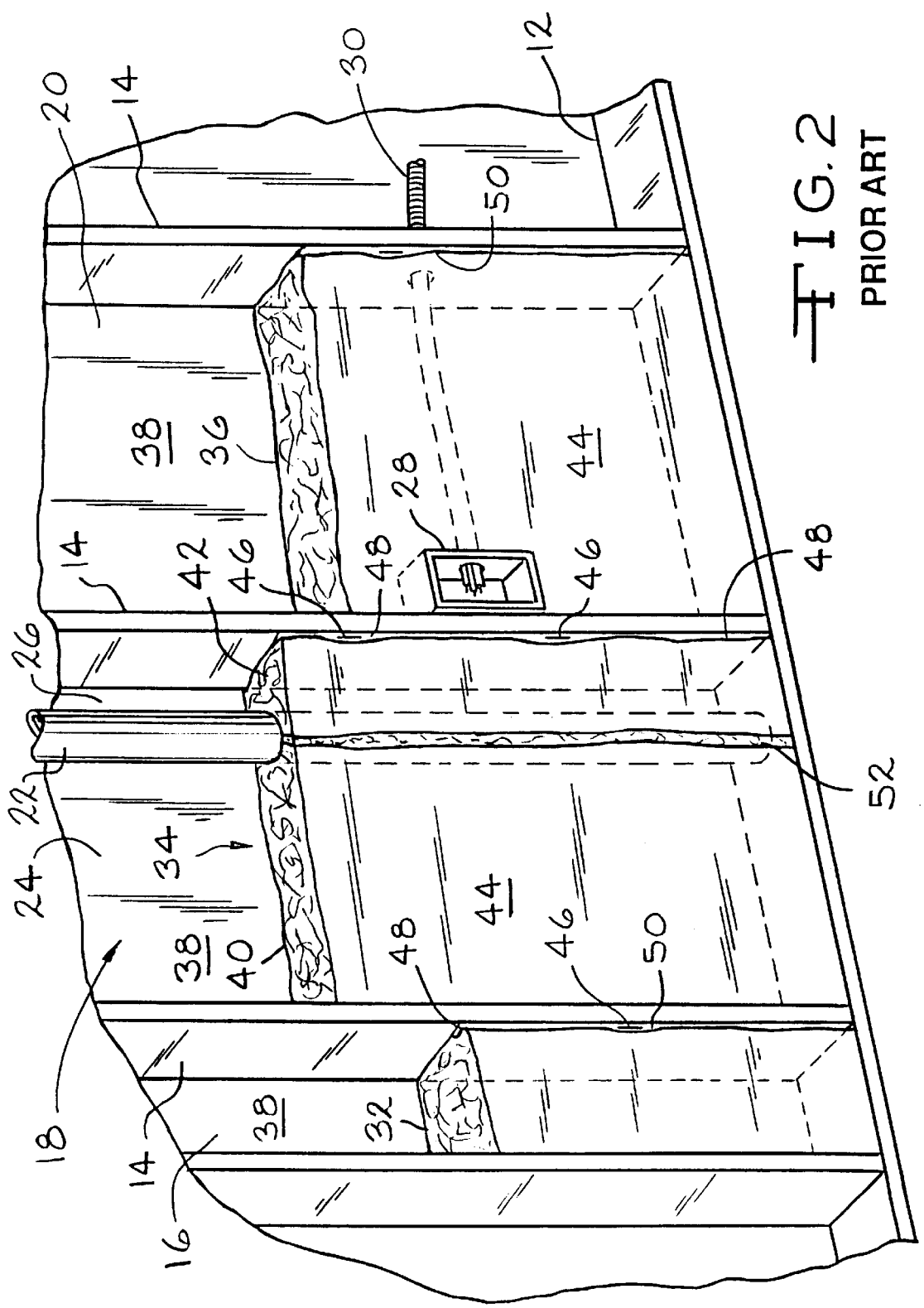
FIG. 2 is a schematic perspective view of the wall cavities of FIG. 1, partially cut away and insulated with typical prior art insulation products.

As shown in FIG. 2, a typical flanged prior art insulation product has been cut to a narrow partial insulation product 32 and installed in insulation cavity 16. Also another prior art insulation product 34 has been installed in nonstandard wall cavity 18, and another similar prior art insulation product 36 has been installed in non standard wall cavity 20. The rear of the insulation cavities 16, 18 and 20 is defined by exterior sheathing 38. It can be seen that in order to install the insulation product 34 into the nonstandard insulation cavity 18, the insulation product was split longitudinally into two partial batts 40 and 42. Further, the facing material 44, which is a kraft paper bonded to the fibrous insulation material by asphalt, has been cut to form the facing for the two partial batts 40 and 42.

The facing material of insulation product 34 is attached to the studs 14 by means of staples 46. Although the stapling of the flanges of the insulation product 32 can be to the ends of the studs, it is preferred that the flanges be side stapled to the sides of the studs. This procedure leaves the ends or exposed edges of the studs smooth for a potentially better application of the drywall. Unfortunately the side or inset stapling of the flanges requires the asphalt/kraft facing to be bent, creating a valley-shaped depression or crease 48 running the length of the insulation product. This crease 48 is undesirable because the insulation material is prevented from flat, smooth contact with the front edge of the insulation cavity, and additionally the insulation material can be overcompressed, thereby lowering the insulation value of the insulation product. Also, the stiff asphalt/kraft facing 44 cannot always be stapled flat against the side of the stud 14, leaving fishmouth or openings 50 between the facing and the sides of the studs.

The insulation of the two partial cavities also presents a problem. It can be seen that the portions of the facing material on the two partial batts 40 and 42 are slightly separated, forming a gap 52 through which water vapor can travel into the insulation material of the batt. The gap 52 is typically caused because cutting the batt and facing material is difficult when the facing material is an asphalt/kraft paper system, as shown in FIG. 2. The opening 50 and the gap 52 are undesirable aspects of the insulation job illustrated in FIG. 2.

The installation of prior art insulation product 36 into insulation cavity 20 involved cutting out a portion of the fibrous insulation material around the electrical outlet box 28. If the insulation were installed without cutting out for the electrical outlet box, the insulation would be over compressed, and might even affect the drywall. Cutting the insulation to accommodate the outlet box required a portion of the flange to be removed. With a conventional asphalt/kraft facing it is difficult to obtain a good seal if a portion of a flange is missing. The difficulty in obtaining a good seal because of the cutout for the outlet box and other obstructions, and because of other imperfections in the structure, results in the openings 50 between the facing material 44 and the stud walls 14. Because of the stiffness of the asphalt/kraft facing combination, openings similar to openings 50 can occur even with standard insulation cavities having no obstructions in situations where the studs are uneven or out of alignment.

Figure 3:
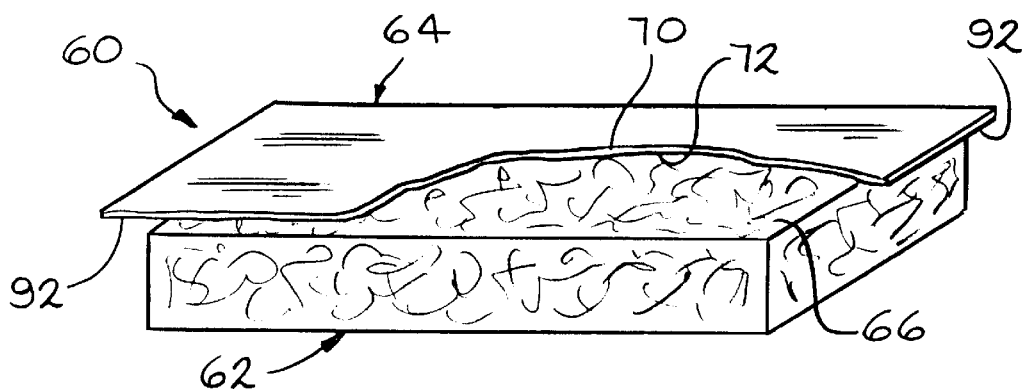
FIG. 3 is a schematic perspective view of a faced insulation product according to the present invention, with a portion cut away.

As shown in FIG. 3, the insulation product of the invention, indicated generally at 60, is comprised of an elongated batt 62 of fibrous insulation material, and a facing 64 adhered to a major surface, front surface 66 of the batt 62. The fibrous insulation material is preferably fibrous glass having a density within the range of from about 0.3 to about 1.0 pounds per cubic foot (pcf), although other densities can be used. Also, other fibers, such as mineral fibers of rock, slag or basalt, can be used as well as organic fibers such as the polymer fibers polypropylene, polyester and polysulfide, as well as other organic fibers. The fibers may be bonded together with a binder material, such as a urea phenol-formaldehyde commonly used with fiberglass insulation, or the glass fibers can be binderless. Binderless glass fibers will be capable of much greater movement within the insulation pack structure than fibers in a pack structure with binder. As used in the present specification and claims, the term "binderless" means the absence of binder materials or the presence of only small amounts of such binder materials, amounting to no more than one percent by weight of the insulation product. Addition of suppressants, e.g. oils, for dust control or other purposes is not considered a binder. An example of an encapsulated binderless product is disclosed in the U.S. Pat. No 5,227,955 to Schelhorn et al., as mentioned above.

The facing 64 is a dual layer facing comprising a coextruded polymer film of a barrier layer 70 and a bonding layer 72. The purpose of the barrier layer 70 is to provide a tough but flexible outer surface for the insulation product 60. The barrier layer 70 is a vapor barrier, although in other embodiments of the insulation, where the insulation product does not need to provide vapor protection, the barrier layer can be vapor porous. Although the preferred form of the facing 64 is a coextruded polymer film, it is to be understood that in other forms of the invention the facing is made of a dual layer film that is not coextruded, but rather formed in another manner, such as by as adhesive, heat lamination or chemical bonding.

The softening temperatures of the barrier layer 70 and bonding layer 72 are different by about 100° F. with the bonding layer having a softening point lower than the softening point of the barrier layer. During the manufacturing process the facing 64 is adhered to the batt 62 by heating the facing to a temperature above the softening point of the bonding layer, but below the softening point of the barrier layer. The facing is adhered to the batt 62 by the attachment of the bonding layer 72 to the fibers in the batt due to the softening of the bonding layer.

A preferred material for the barrier layer is a high density polyethylene (HDPE) film having a softening point within the range of from about 250 to about 280° F., and most preferably about 275° F. High molecular weight HDPE can also be used, but a greater cost. Another material suitable for the barrier layer is a polypropylene film having a softening point within the range of from about 330 to about 390° F. Other polymer films, such as polypropylene, polyester and polystyrene could also be used.

A preferred material for the bonding layer is film of one or more materials of the group consisting of ethylene N-butyl acrylate, ethylene methyl acrylate and ethylene ethyl acrylate. These three materials are available from Newtech Plastics, Inc., Covington, Ohio, and they can be used alone, in combination with each other, or in combination with other materials, such as a low melt polyethylene material. The softening points of these materials are within the range of from about 100 to about 180° F., and most preferably within the range of from about 120 to about 140° F. Preferably these ethylene acrylate materials are synthesized using a metallocene catalyst to lower the softening point. Another material potentially useful for the low melt bonding layer is a low melt polyethylene, preferably having a metallocene catalyst to lower the softening point.

The difference in softening temperatures for the barrier layer and the bonding layer is preferably within the range of from about 50 to about 225° F., and for an HDPE/ethylene acrylate system (i.e., ethylene N-butyl acrylate, ethylene methyl acrylate and ethylene ethyl acrylate), the temperature difference is about 140° F. One of the great advantages of the HDPE/ethylene acrylate facing system of the invention is that the facing and insulation product can be cut easily over a broad temperature range. The bonding layer 72 is readily cuttable at even such warm temperatures as about 110° F., and will not leave a gummy residue on the cutting tool. The facing does not soften at temperatures less than about 110° F., and is not brittle at temperatures greater than about 30° F. Another advantage of the faced insulation product 60 of the invention is that the facing 64 is more flexible than a conventional asphalt/kraft paper facing. As measured by ASTM test D-1388 the flexural rigidity of the facing of the invention is preferably less than 500 gm cm, whereas the flexural rigidity of standard asphalt/Kraft facing is greater than about 2000 gm cm. Further, the elastic (tangent)

modulus of the facing 64 of the invention, as measured by ASTM D-882, is within the range of from about 25,000 to about 200,000 pounds per square inch (psi). Typically, the elastic modulus of the facing of the invention is about 100,000 psi.

In its most preferred form the facing is a multilayer film 78, as shown in FIG. 8, comprising a barrier layer 80, a bonding layer 82 and a carrier layer 84. The barrier layer 80 and bonding layer 82 can be similar to the HDPE and ethylene acrylate (i.e., ethylene N-butyl acrylate, ethylene methyl acrylate and ethylene ethyl acrylate) layers 70 and 72, respectively. The carrier layer can be a linear low density polyethylene (LLDPE) with a softening point of about 230° F., and the carrier layer can be reinforced by any suitable material. Using a carrier layer is particularly advantageous where the difference in softening temperatures between the barrier layer and the bonding layer is great. The carrier layer provides an insulative barrier between the barrier layer and the bonding layer during the coextrusion of the polymer film sufficient to improve the permissible difference in softening temperatures between the barrier layer and the bonding layer, preferably by at least 30° F. Another advantage of using a carrier layer is that it allows separation of the function of the vapor barrier quality of the barrier layer and the outside surface of the facing as follows: the carrier layer (i.e., the middle layer of the three layers) can be configured to be the actual vapor barrier layer, and the outside layer can be a high friction surface that is not necessarily a vapor barrier, but is a surface designed for good printability. High density polyethylene may be too slippery for good printing.

In another embodiment, not shown, the multilayer facing film includes four individual layers, two HDPE layers, a carrier layer, and a bonding layer.

The facing 64 for the insulation product 60, and the facing 78 for the multilayer product both have an overall thickness, before the bonding step, within the range of from about 0.4 to about 4 mils (about 10 to about 100 microns), and preferably within the range of from about 0.5 to about 1.5 mils (about 12.5 to about 37.5 microns). The two layers of the two-layer facing 64 preferably have equal thicknesses. For the multiple facing 78, preferably each of its three layers is roughly one-third of the thickness of the facing.

Figure 4:
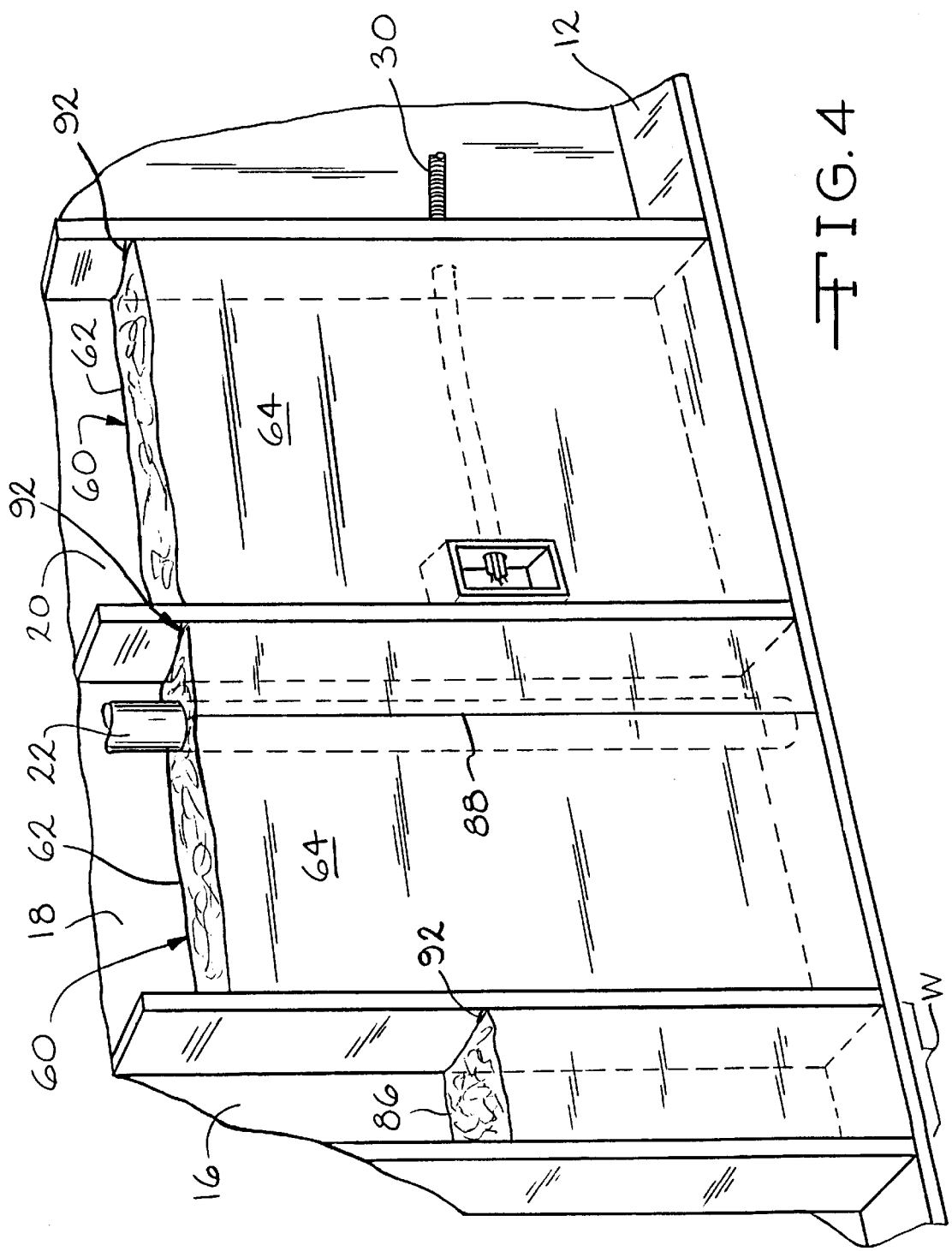
FIG. 4 is a schematic perspective view of the insulation product of FIG. 3, partially cut away and installed into the wall cavity of FIG. 1.

As shown in FIG. 4, the insulation product 60 of the invention is applied into nonstandard insulation cavities 16, 18 and 20. In the insulation cavity 18 the insulation product has been divided or cut into partial batts in order to fit around the vent pipe 22. Because of the flexibility and cutability of the facing 64, however, the only evidence of the fact that the insulation product 60 is divided into two partial batts is the seam 88 in the facing 64. This seam can be of minimal width, with practically no gap, as shown. Further, in contrast to the jagged gap 48 in the prior art cut asphalt/kraft facing 44 illustrated in FIG. 2, the seam 88 is relatively straight. In a similar manner, the cutting of the insulation product 60 to accommodate the electrical box 28 can be accomplished without a seam. The insulation of cavities 16, 18 and 20 with the insulation product 60, having the flexible facing 64, lends itself to a smooth appearance for the insulation product, and the friction fit of the insulation product 60 enables installation without the need for staples or other fasteners. Optionally, the seams 88 can be covered with tape to provide an absolute vapor barrier, but this should not usually be necessary with the facing of the invention.

As shown in FIGS. 3 and 4, the facing 64 can be provided with extension flaps 92 that can be tucked between the insulation product 60 and the studs 14 to provide a better vapor seal at the side edges of the insulation product. These extension flaps 92 are not strong enough for stapling purposes, and therefore are not to be considered to be stapling flanges. Preferably, the extension flaps extend about ½ to 1 inch beyond the side edges of the batt. When the facing is a coextruded dual or tri layer film having a low softening point bonding layer on side facing the fibrous insulation batt, the difference in softening points and coefficients of thermal expansion between the two layers causes a curling of the extension flap toward the insulation material. This curling helps provide a good seal when the extension flap is tucked between the facing and the stud.

A particular advantage of the insulation product and method of the invention is the reduction in installation time for the insulation. The elimination of the stapling of flanges for the product of the invention significantly reduces the installation time, with the installation time of the product of the invention being at least 10 percent faster, and possibly up to 50 percent faster than standard asphalt/kraft faced insulation. The time savings come from elimination of the stapling operation and eliminating the use of the stiff kraft paper that is hard to handle and install in the wall.

Figure 5:
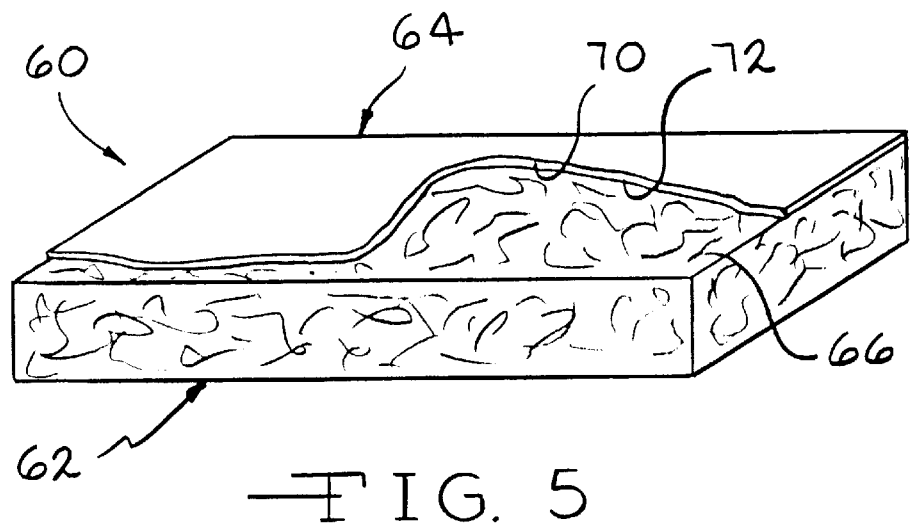
FIG. 5 is a schematic perspective view, similar to FIG. 3, of another embodiment of the insulation product according to the present invention, having no side edge extensions.

As shown in FIG. 5, another embodiment of the invention is similar in all respects to the insulation product illustrated in FIG. 3 except that there are no extension flaps.

Figure 6:
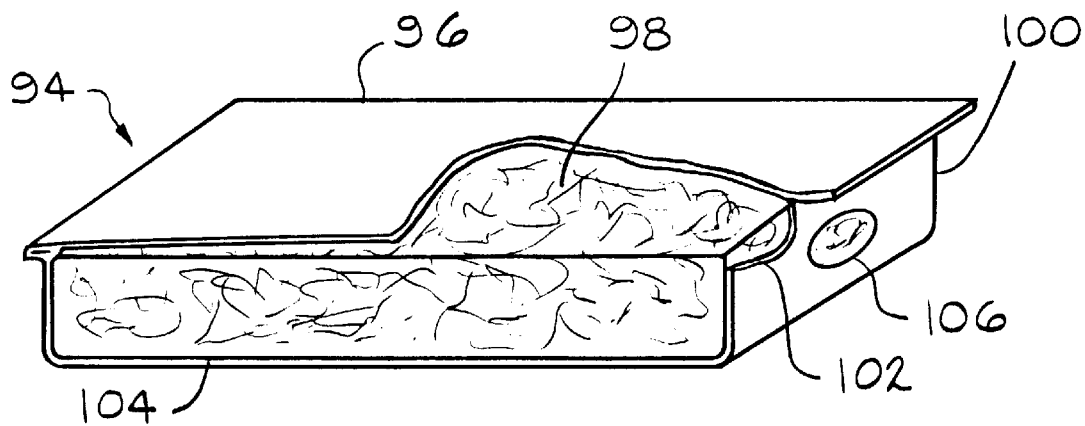
FIG. 6 is a schematic perspective view of another embodiment of the insulation product according to the present invention, with a portion cut away, and having encapsulation material on the rear and sides of the insulation product.

In an alternate embodiment of the invention illustrated in FIG. 6, an insulation product 94, has a facing 96, similar to the facing 64, on one major surface of the batt 98. This insulation product is provided with an encapsulation film 100 on the side edges 102 and rear major face 104 of the batt. The encapsulation film can be attached to the fibrous batt in any suitable manner, such as by an adhesive layer or strip. For example, a strip of hot melt adhesive can be applied in liquid form during manufacture of the insulation product. For example, U.S. Pat. No 5,277,995 to Schelhorn et al. discloses an encapsulated batt with an encapsulation material adhered with an adhesive that can be applied in longitudinal stripes, or in patterns such as dots, or in an adhesive matrix. Alternatively, the encapsulation film can be securely bonded to the entire surface of the side edges and the rear major surface, such as by using a multilayer coextruded film similar to the facing 64. Such a film might be, for example, a dual film of HDPE and polyethylene (PE), with a thickness within the range of from about 0.5 to about 0.8 mils. Although the embodiment of the invention shown in FIG. 6 includes encapsulation on the side edges and rear major surface of the batt 98, it is to be understood that another embodiment of the invention, not shown, provides encapsulation material on the rear surface only, with the side edges lacking the encapsulation material.

The insulation product 94 optionally can be provided with an opening 106 in the side edge of the facing 100 to expose the glass fibers in the batt 98. The glass fibers inherently have high friction component, and therefore the opening 106 provides a friction enhancing aspect of the batt to aid in the friction fit application of the insulation product 94 into insulation cavities. Another friction enhancing element is the addition of friction surface treatment, such as a semi-tacky coating, to the side edge of the facing 100.

Figure 7:
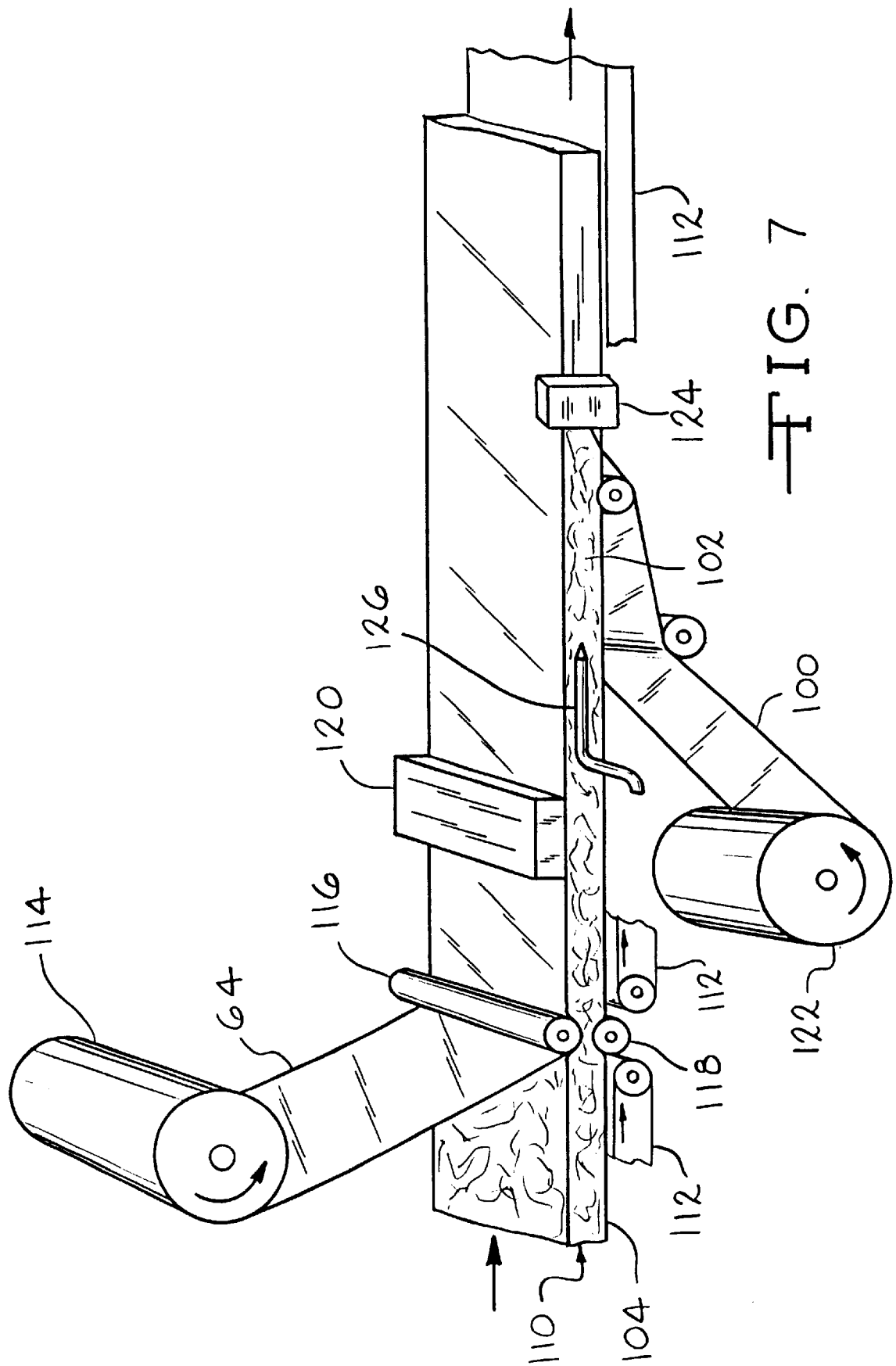
FIG. 7 is a schematic perspective view of apparatus for manufacturing the insulation products of the invention.

The encapsulation material can be applied to the insulation batt by any suitable process. Apparatus suitable for directing and guiding the encapsulation material onto the glass fiber pack is disclosed in U.S. Pat. No 5,545,279 to Hall et al., which is hereby incorporated by reference. As shown in FIG. 7, a pack 110 of glass fibers is being carried on a conveyor 112. The manufacture of the glass fiber pack 110 is well known technology, and those skilled in the art will be aware of several conventional methods for producing glass fiber packs. The glass fiber pack is preferably a light density insulation material, having a density within the range of from about 0.3 to about 1.0 pounds per square foot (pcf). The glass fiber pack can be bonded with a binder material, such as a urea phenol-formaldehyde binder, as is well known in the art. Alternatively, the glass fiber pack can be binderless.

A sheet of the facing material 64 is payed out from roll 114 and directed into contact with the glass fiber pack 110. The facing material 64 is pressed into forceful contact with the pack by the action of journaled pressing rolls 116 and 118, which compress the glass fiber pack by a ratio of up to 25:1, and preferably about 10:1. The amount of compression needed will be a function of the density. The upper pressing roll 116 is heated so that the temperature of the facing 64 will increase to a point above the softening point of the bonding layer. The heating of the roll 116 can be accomplished by any means, such as by electrical resistance heating or by the circulation of hot oil. The combination of the softened bonding layer and the extreme pressure applied by the two pressing rolls 116 and 118 causes the bonding layer to firmly bond the barrier layer to the glass fiber pack 110. An alternative method of heating the bonding layer is with an infrared heater 120, as shown. Such a heater would have to be positioned immediately upstream of a pair of pressing rolls, not shown, similar to rolls 116 and 118, so that the softened bonding layer could be pressed into the fibrous batt and be integrally bonded to the batt. Ultrasonic, laser and microwave bonding can also be used. Optionally, a cooling section, not shown, can be used to cool the softened layer after the bonding process.

As also shown in FIG. 7, the remainder of the surface of the fibrous pack 110, i.e., the side edges 102 and the rear major face 104 can be encapsulated with encapsulation material or film 100 which can be supplied by encapsulation film roll 122. The film 100 can be applied using a folding shoe 124, an example of which is disclosed in the above-identified U.S. Pat. No 5,545,279 to Hall et al. As disclosed above, the encapsulation film can be bonded with small amounts of discrete adhesive bands. The adhesive can be applied by any suitable means, such as an adhesive nozzle 126, supplied with an appropriate adhesive from a source, not shown. In the alternative, the encapsulation film 100 can be securely bonded to the entire surface of the side edges and the rear major surface with a multilayer coextruded film similar to the facing 64, as disclosed above. Also, it is to be understood that the encapsulation material can be applied just to the rear surface, leaving the side edges unencapsulated.

As shown in fig. 8, a faced insulation product 60 of the invention has been slit longitudinally to provide partial batts 130 and 132 suitable for insulating nonstandard insulation cavities. The insulation product 60 is faced with the facing 64 of the invention, but there is no encapsulation material. The insulation product is a bindered product, and therefore the partial batts 130 and 132 will maintain their shape and handleability even when cut. Either of the partial batts is suitable for insulating nonstandard insulation cavities, such as the partial cavity 26 shown in FIG. 1, or such as the narrow cavity 16 is shown in FIG. 1.

The principle and mode of operation of this invention have been described in its preferred embodiments. However, it should be noted that this invention may be practiced otherwise than as specifically illustrated and described without departing from its scope.

What is claimed is:

1. An insulation product comprising an elongated batt of fibrous insulation material, and a facing adhered to a major surface of the batt, wherein the facing is a coextruded polymer film of barrier, carrier and bonding layers, with the bonding layer having a softening point lower than the softening point of the barrier layer, and with the carrier layer being positioned between the barrier and bonding layers, wherein the facing has been heated to a temperature above the softening point of the bonding layer, but below the softening point of the barrier layer, whereby the facing is adhered to the batt by the attachment of the bonding layer to the fibers in the batt due to the softening of the bonding layer.

2. The insulation product of claim 1 in which the barrier layer is vapor barrier.

3. The insulation product of claim 1 in which the facing is cuttable, does not soften at less than 110° F., and is not brittle at temperatures greater than about 30° F.

4. The insulation product of claim 1 in which the batt has edges, and the facing has extensions beyond the edges of the batt, said batt extensions having lengths sufficient for tucking between the edge of the insulation product and a construction wall stud, but said extensions being inadequately strong for stapling to the construction wall stud.

5. The insulation product of claim 1 in which the facing, including the extensions, has a flexural rigidity less than 500 gm cm.

6. The insulation product of claim 1 in which the facing has an elastic modulus within the range of from about 25,000 to about 200,000 pounds per square inch.

7. The insulation product of claim 1 in which the barrier layer is selected from the group of polyethylene, polypropylene, polyester and polystyrene.

8. The insulation product of claim 1 in which the insulation product has a friction enhancing portion on the sides of the insulation product to aid friction fit of the insulation product in an insulation cavity.

9. The insulation product of claim 1 in which the carrier layer provides an insulative barrier between the barrier layer and the bonding layer during the coextrusion of the polymer film sufficient to improve the permissible difference in softening temperatures between the barrier layer and the bonding layer by at least 30° F.

10. The insulation product of claim 1 in which the carrier layer is a linear low density polyethylene.

11. The insulation product of claim 1 in which difference in softening temperatures for the barrier layer and the bonding layer is within the range of from about 50 to about 225° F.

12. The insulation product of claim 1 in which the bonding layer is one or more materials of the group consisting of ethylene N-butyl acrylate copolymer, ethylene methyl acrylate copolymer, ethylene ethyl acrylate copolymer, and low density polyethylene.

13. The insulation product of claim 12 in which the bonding layer consists essentially of one of ethylene N-butyl acrylate copolymer, ethylene methyl acrylate copolymer, ethylene ethyl acrylate copolymer, or low density polyethylene.

14. The insulation product of claim 13 in which the bonding layer consists essentially of low density polyethylene.

15. The insulation product of claim 1 in which the low density polyethylene is metallocene-catalyst-based.

16. An insulation product comprising an elongated batt of fibrous insulation material, and a facing adhered to a major surface of the batt, wherein the facing is a coextruded polymer film having a barrier layer between a bonding layer and a third layer, with the bonding layer having a softening point lower than the softening point of the barrier layer, and with the third layer having a high friction surface for good printability, wherein the facing has been heated to a temperature above the softening point of the bonding layer, but below the softening point of the barrier layer, whereby the facing is adhered to the batt by the attachment of the bonding layer to the fibers in the batt due to the softening of the bonding layer.

17. The insulation product of claim 16, further comprising a carrier layer between said bonding layer and said barrier layer.

18. A method of making an insulation product comprising:
  positioning a coextruded polymer film in contact with a major face of an elongated batt of fibrous insulation material, wherein the coextruded polymer film includes a carrier layer between a barrier layer and a bonding layer, and with the bonding layer having a softening point lower than the softening point of the barrier layer; and
  heating the coextruded polymer film to a temperature above the softening point of the bonding layer, but below the softening point of the barrier layer, while maintaining the coextruded polymer facing in contact with the batt to soften the bonding layer to an extent sufficient to attach the bonding layer to the fibers in the batt and thereby adhere the coextruded polymer facing to the batt.

19. An insulation product comprising an elongated batt of fibrous insulation material and a coextruded polymer facing adhered thereto, wherein the coextruded polymer facing is a coextruded polymer film is a coextruded polymer film including a carrier layer between a barrier layer and a bonding layer, wherein the coextruded polymer facing has been heated to a temperature above the softening point of the bonding layer, but below the softening point of the barrier layer, whereby the coextruded polymer facing is adhered to the batt by the attachment of the bonding layer to the fibers in the batt due to the softening of the bonding layer.

20. A method for installing an insulation product comprising:
  providing an insulation product comprising an elongated batt of fibrous insulation material, and a facing adhered to a major surface of the batt, wherein the facing is a coextruded polymer film of barrier and bonding layers, with the bonding layer having a softening point lower than the softening point of the barrier layer, and wherein the facing has been heated to a temperature above the softening point of the bonding layer, but below the softening point of the barrier layer, whereby the facing is adhered to the batt by the attachment of the bonding layer to the fibers in the batt due to the softening of the bonding layer, and wherein the facing has no flanges; and
  installing the insulation product in an insulation cavity by pressing the insulation product into place between opposed structural members.

21. The method of claim 20 in which the opposed structural members are wall studs.

22. The method of claim 20 in which the facing has extension flaps.

23. A method for installing an insulation product comprising:
  providing an insulation product comprising an elongated batt of fibrous insulation material, and a coextruded polymer facing adhered to a major surface of the batt, wherein the coextruded polymer facing is a coextruded polymer film including a carrier layer between a barrier layer and a bonding layer, with the bonding layer having a softening point lower than the softening point of the barrier layer, and wherein the coextruded polymer facing has been heated to a temperature above the softening point of the bonding layer, but below the softening point of the barrier layer, whereby the coextruded polymer facing is adhered to the batt by the attachment of the bonding layer to the fibers in the batt due to the softening of the bonding layer, and wherein the coextruded polymer facing has no flanges; and
  installing the insulation product in an insulation cavity by pressing the insulation product into place between opposed structural members.

* * * * *